United States Patent
Takeda

(10) Patent No.: US 12,397,723 B2
(45) Date of Patent: Aug. 26, 2025

(54) DISPLAY CONTROLLER, DISPLAY CONTROL METHOD, AND STORAGE MEDIUM

(71) Applicant: ISUZU MOTORS LIMITED, Yokohama (JP)

(72) Inventor: Ai Takeda, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 153 days.

(21) Appl. No.: 18/510,116

(22) Filed: Nov. 15, 2023

(65) Prior Publication Data

US 2024/0198922 A1 Jun. 20, 2024

(30) Foreign Application Priority Data

Dec. 14, 2022 (JP) ................................. 2022-199751

(51) Int. Cl.
*B60R 11/02* (2006.01)
*B60R 11/04* (2006.01)

(52) U.S. Cl.
CPC ...... *B60R 11/0229* (2013.01); *B60R 11/0264* (2013.01); *B60R 11/04* (2013.01); *B60R 2300/108* (2013.01); *B60R 2300/207* (2013.01); *B60R 2300/307* (2013.01)

(58) Field of Classification Search
None
See application file for complete search history.

(56) References Cited

U.S. PATENT DOCUMENTS

| 2015/0035981 | A1* | 2/2015 | Otsuki ................ G06V 20/582 |
| | | | 348/148 |
| 2017/0236414 | A1 | 8/2017 | Nishimura |
| 2023/0102205 | A1* | 3/2023 | Delaney ................ B60K 35/10 |
| | | | 707/740 |

FOREIGN PATENT DOCUMENTS

| JP | 2008-305042 A | 12/2008 |
| JP | 2010-198198 A | 9/2010 |
| JP | 2011-108175 A | 6/2011 |
| JP | 2017-142756 A | 8/2017 |
| JP | 2018-163667 A | 10/2018 |
| JP | 2019-212190 A | 12/2019 |
| JP | 2020-060929 A | 4/2020 |

\* cited by examiner

*Primary Examiner* — Rebecca A Volentine
(74) *Attorney, Agent, or Firm* — PROCOPIO, CORY, HARGREAVES & SAVITCH LLP

(57) ABSTRACT

A display controller includes an acquisition part that acquires a distance between a regulatory sign installed in a region ahead of a vehicle and the vehicle, and a display control part that causes a display part to display an image corresponding to the regulatory sign on the basis of the distance acquired by the acquisition part, wherein the display control part begins to display the image corresponding to the regulatory sign in response the distance between the regulatory sign and the vehicle becoming equal to or less than a first distance when the regulatory sign indicates Stop, and beings to display the image corresponding to the regulatory sign in response to the distance between the regulatory sign and the vehicle becoming equal to or less than a second distance, which is less than the first distance, when the regulatory sign indicates No Entry.

11 Claims, 7 Drawing Sheets

| REGULATORY SIGN ID | DISPLAY INITIATION DISTANCE | DISPLAY IMAGE NAME |
|---|---|---|
| R1 | L1 | P1 |
| R2 | L2 | P2 |
| ... | ... | ... |

FIG. 2

DISPLAY CONTROLLER, DISPLAY CONTROL METHOD, AND STORAGE MEDIUM

CROSS-REFERENCE TO RELATED APPLICATIONS

The present application claims priority to Japanese Patent Application number 2022-199751, filed on Dec. 14, 2022, contents of which are incorporated herein by reference in its entirety.

BACKGROUND OF THE INVENTION

The present disclosure relates to a display controller, a display control method, and a storage medium. A conventional electronic device provides a driver with a notification to the effect that a distance between a regulatory sign indicating Stop and a vehicle became equal to or less than a predetermined distance (for example, Japanese Unexamined Patent Application Publication No. 2020-60929.)

A conventional electronic device provides notification to a driver in a case where a distance between his/her vehicle and a regulatory sign is equal to or less than a certain distance regardless of the type of regulatory sign. Therefore, when a No Entry regulatory sign is installed past an intersection ahead in the traveling direction of the vehicle, there is a possibility that the conventional electronic device may provide the notification to the driver before the vehicle enters the intersection by recognizing that regulatory sign. As a result, there was a problem that the driver may erroneously recognize that vehicles are prohibited from entering the intersection.

BRIEF SUMMARY OF THE INVENTION

The present disclosure focuses on this point, and its object is to notify a driver at an appropriate traveling position that vehicles are prohibited from entering.

A display controller according to a first aspect of the present disclosure including: an acquisition part that acquires a distance between a regulatory sign installed in a region ahead of a vehicle and the vehicle; and a display control part that causes a display part to display an image corresponding to the regulatory sign on the basis of the distance acquired by the acquisition part, wherein the display control part begins to display the image corresponding to the regulatory sign in response to the distance between the regulatory sign and the vehicle becoming equal to or less than a first distance when the regulatory sign indicates Stop, and begins to display the image corresponding to the regulatory sign in response to the distance between the regulatory sign and the vehicle becoming equal to or less than a second distance, which is less than the first distance, when the regulatory sign indicates No Entry.

A display control method according to a second aspect of the present disclosure executed by a processor and including: acquiring a distance between a regulatory sign installed in a region ahead of a vehicle and the vehicle; and causing a display part to display an image corresponding to the regulatory sign on the basis of the distance, wherein the displaying on the display part includes: beginning to display the image corresponding to the regulatory sign in response to the distance between the regulatory sign and the vehicle becoming equal to or less than a first distance when the regulatory sign indicates Stop, and beginning to display the image corresponding to the regulatory sign in response to the distance between the regulatory sign and the vehicle becoming equal to or less than a second distance, which is less than the first distance, when the regulatory sign indicates No Entry.

A storage medium according to a third aspect of the present disclosure stores a program that causes a processor to execute: acquiring a distance between a regulatory sign installed in a region ahead of a vehicle and the vehicle; and causing a display part to display an image corresponding to the regulatory sign on the basis of the distance, wherein the causing the display part to display includes: beginning to display the image corresponding to the regulatory sign in response to the distance between the regulatory sign and the vehicle becoming equal to or less than a first distance when the regulatory sign indicates Stop, and beginning to display the image corresponding to the regulatory sign in response to the distance between the regulatory sign and the vehicle becoming equal to or less than a second distance, which is less than the first distance, when the regulatory sign indicates No Entry.

BRIEF DESCRIPTION OF THE DRAWINGS

FIG. 2 is a diagram illustrating an example of information about regulatory signs stored in a storage 22.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Outline of a Vehicle S>

Figure 1:
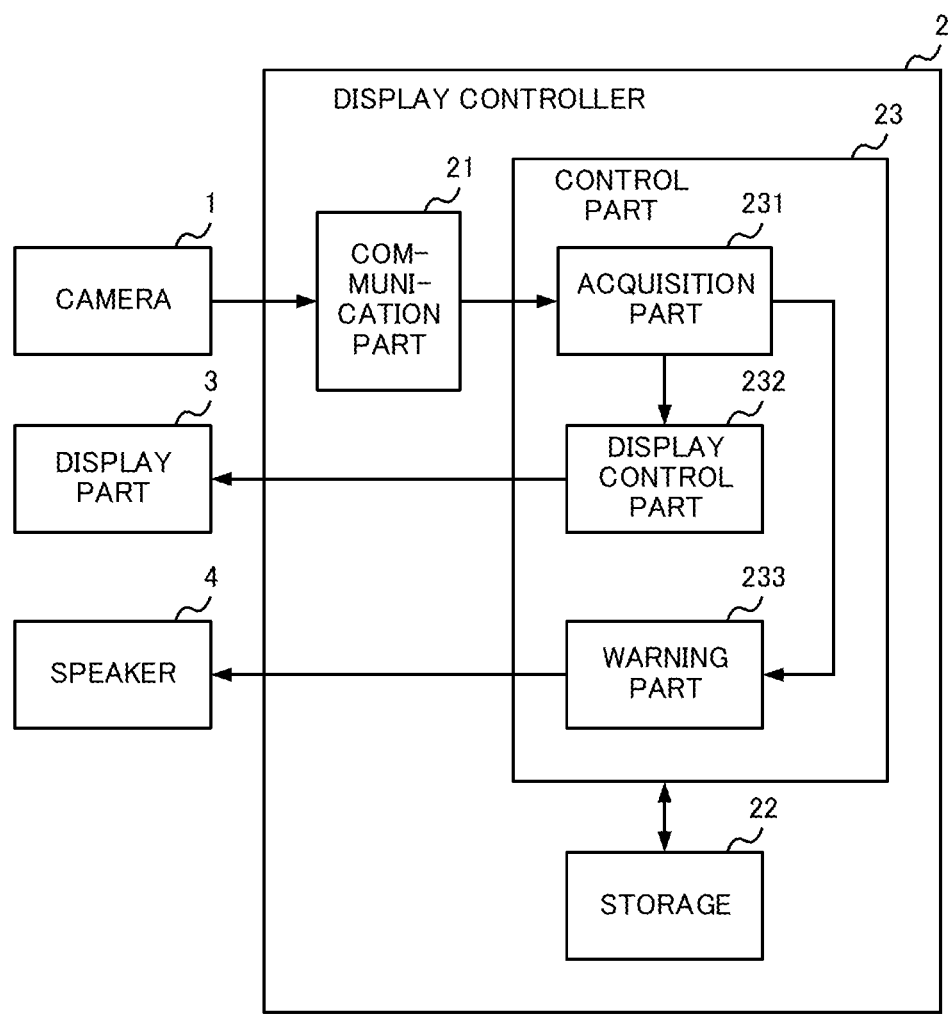
FIG. 1 is a diagram illustrating an outline of a vehicle S according to the present embodiment.

FIG. 1 is a diagram illustrating an outline of a vehicle S according to the present embodiment. A vehicle S shown in FIG. 1 includes a camera 1, a display controller 2, a display part 3, and a speaker 4. The vehicle S has a function of displaying, on the display part 3 such as a display, content of regulations indicated by a regulatory sign installed ahead in the vehicle S's traveling direction. The content of the restrictions is a speed limit, No Passing, Stop, or No Entry, for example.

The camera 1 is a detection device that extracts a regulatory sign from a captured image generated by capturing a region ahead in the vehicle S's traveling direction, and transmits (i) identification information (hereinafter referred to as a "regulatory sign ID") corresponding to said regulatory sign and (ii) a distance between the regulatory sign and the vehicle S to the display controller 2.

The display controller 2 executes a process of causing the display part 3 to display an image corresponding to the regulatory sign ID acquired from the camera 1. The image is an image showing a mode of the regulatory sign corresponding to the regulatory sign ID, for example. The display controller 2 may have a housing including electronic components, or may be a printed circuit board on which the electronic components are mounted.

The display part 3 is a display that displays a speed, fuel level, time, temperature, or the like, and acquires an image corresponding to the regulatory sign ID from the display controller 2 and displays the image. The display part 3 is provided on an instrument panel of the vehicle S, but may instead be provided on an information terminal used by a driver.

The speaker 4 acquires sound output from the display controller 2 and outputs the sound. The sound acquired by the speaker 4 from the display controller 2 is sound for warning the driver that the vehicle S has passed by a regulatory sign indicating No Entry, for example.

In a case of a regulatory sign indicating Stop, the display controller 2 needs to cause the display part 3 to display an image corresponding to that regulatory sign at a timing when the vehicle S reaches a position which is a predetermined distance short of a stop line. However, in a case where a regulatory sign indicating No Entry is installed past an intersection that is ahead in the vehicle S's traveling direction, if an image corresponding to that regulatory sign is displayed at the above timing as well, the driver may erroneously recognize that vehicles are prohibited from entering the intersection.

To counteract this, in the case where the regulatory sign indicates No Entry, the display controller 2 causes the display part 3 to start the displaying at a timing when the vehicle S is closer to the regulatory sign than in the case where the regulatory sign indicates Stop. By doing this, the notification of No Entry is provided to the driver at the appropriate traveling position, and therefore it is possible to prevent the driver from erroneously recognizing that vehicles are prohibited from entering an intersection in the case where the regulatory sign indicating No Entry is installed past the intersection. Hereinafter, a configuration and operation of the display controller 2 will be described in detail.

<Configuration of the Display Controller 2>

The display controller 2 includes a communication part 21, a storage 22, and a control part 23. The control part 23 includes an acquisition part 231, a display control part 232, and a warning part 233.

The communication part 21 includes a communication device for transmitting and receiving information via a network or a digital signal transmission bus. The communication device is a controller area network (CAN) controller, for example.

The storage 22 includes a storage medium such as a read only memory (ROM), a random access memory (RAM), a hard disk drive (HDD), or a solid state drive (SSD). The storage 22 stores a program executed by the control part 23. The storage 22 stores various types of information for displaying an image corresponding to a regulatory sign on the display part 3.

FIG. 2 shows an example of information about regulatory signs stored in the storage 22. In FIG. 2, a regulatory sign ID, a display initiation distance, and a display image name are associated with each other. The display initiation distance is a distance between the regulatory sign and the vehicle S that causes the display part 3 to start displaying an image corresponding to the regulatory sign. The display image name is an image data name of an image to be displayed on the display part 3, and is a file name of image data associated with an address in the storage 22. The control part 23 can access the image data by designating the display image name.

The control part 23 is a processor such as a central processing unit (CPU) or an electronic control unit (ECU), for example. The control part 23 functions as the acquisition part 231, the display control part 232, and the warning part 233 by executing the program stored in the storage 22. The control part 23 may be configured with a single processor, or may be configured with a plurality of processors or a combination of one or more processors and an electronic circuit. The configuration of each unit implemented by the control part 23 will be described below.

The acquisition part 231 acquires (i) a distance between the regulatory sign installed ahead in the vehicle S' traveling direction and the vehicle S, and (ii) a regulatory sign ID corresponding to the regulatory sign. The acquisition part 231 stores (i) the distance between the regulatory sign and the vehicle S and the regulatory sign ID acquired from the camera 1 via the communication part 21 in association with (ii) a timing at which the distance and the regulatory sign ID are acquired in the storage 22, for example. The acquisition part 231 can be said to be a receiving part that receives information indicating regulatory signs from the camera 1 via the communication part 21.

The acquisition part 231 may further acquire a vehicle speed of the vehicle S. For example, the acquisition part 231 acquires the vehicle speed of the vehicle S from a vehicle speed sensor (not shown) included in the vehicle S, and stores the vehicle speed in the storage 22 in association with a timing at which the vehicle speed is acquired.

On the basis of the distance acquired by the acquisition part 231, the display control part 232 causes the display part 3 to display an image corresponding to the regulatory sign extracted by the camera 1. On condition that the distance acquired by the acquisition part 231 has become equal to or less than a predetermined distance for beginning to display an image corresponding to the regulatory sign ID acquired by the acquisition part 231, the display control part 232 causes the display part 3 to display said image, for example. The predetermined distance is a display initiation distance shown in FIG. 2. That is, it can be said that the display control part 232 causes the display part 3 to display said image on condition that the distance between the regulatory sign and vehicle S has become equal to or less than the display initiation distance indicating the distance for beginning to display the image corresponding to the regulatory sign ID.

For example, by referencing the information about the regulatory signs shown in FIG. 2, the display control part 232 identifies the display initiation distance corresponding to the regulatory sign ID acquired by the acquisition part 231, and determines whether the distance acquired by the acquisition part 231 is equal to or less than the identified display initiation distance. The display control part 232 causes the storage 22 to store (i) a determination result of whether the acquired distance is equal to or less than the display initiation distance in association with (ii) a timing at which the determination is made.

Next, by referencing the storage 22, the display control part 232 identifies a determination result having a determination timing before the current timing. If the determination result having the determination timing before the current timing is "greater than the display initiation distance" and the determination result having the current timing is "less than or equal to the display initiation distance", the display control part 232 causes the display part 3 to display an image indicated by the "display image name" corresponding to the regulatory sign ID, by referencing FIG. 2. Since the display control part 232 operates in this manner, a position at which to start the displaying can be set for each type of regulatory sign.

When the regulatory sign corresponding to the regulatory sign ID indicates Stop, the display control part 232 begins to display the image corresponding to the regulatory sign on condition that the distance between the regulatory sign and the vehicle S has become equal to or less than a first display initiation distance L1. That is, when the regulatory sign extracted by the camera 1 indicates Stop, the display control part 232 begins to display the image corresponding to the regulatory sign in response to the fact that the distance between the regulatory sign and the vehicle S has become equal to or less than the first display initiation distance L1. The first display initiation distance L1 is a distance at which the vehicle S can come to a stop before the stop line, and is a distance (approximately 42 m) travelled from when the vehicle S travelling at a speed of 40 km per hour starts decelerating at a deceleration of 1.5 m per second until it stops, for example. The first display initiation distance L1 is included in the "display initiation distance" shown in FIG. 2.

Figure 3:
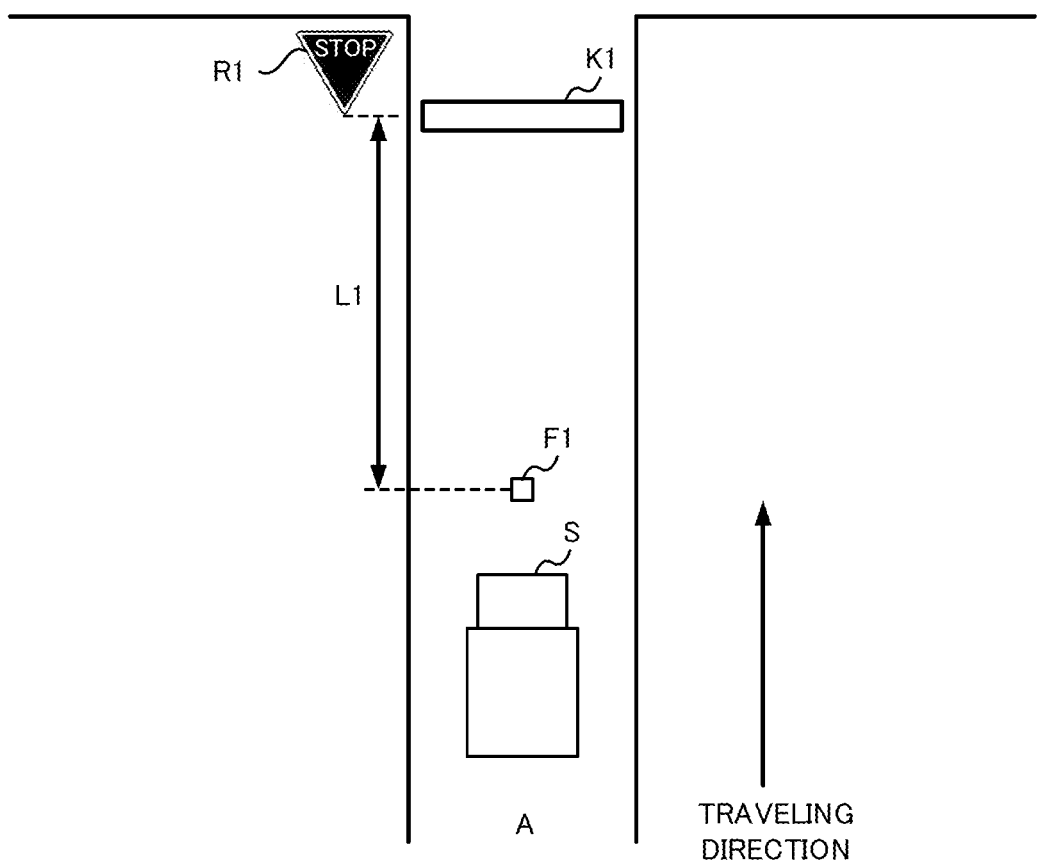
FIG. 3 illustrates an operation for a regulatory sign indicating Stop.

FIG. 3 illustrates an operation for a regulatory sign indicating Stop. In FIG. 3, a sign R1 indicating Stop is installed ahead in the traveling direction of the vehicle S traveling on a road A, and a stop line K1 corresponding to the sign R1 is provided. For example, the display control part 232 identifies that a distance between the sign R1 and the vehicle S has become equal to or less than the first display initiation distance L1 at a timing when the front end of the vehicle S reaches a position F1, and begins to display an image corresponding to the sign R1.

When the regulatory sign corresponding to the regulatory sign ID indicates No Entry, the display control part 232 begins to display an image corresponding to the regulatory sign on condition that the distance between the regulatory sign and the vehicle S has become equal to or less than a second display initiation distance L2 which is less than the first display initiation distance L1. In other words, when the regulatory sign extracted by the camera 1 indicates No Entry, the display control part 232 begins to display the image corresponding to the regulatory sign in response to the fact that the distance between the regulatory sign and the vehicle S has become equal to or less than the second display initiation distance L2 which is less than the first display initiation distance L1. The details of the second display initiation distance L2 will be described later.

Figure 4:
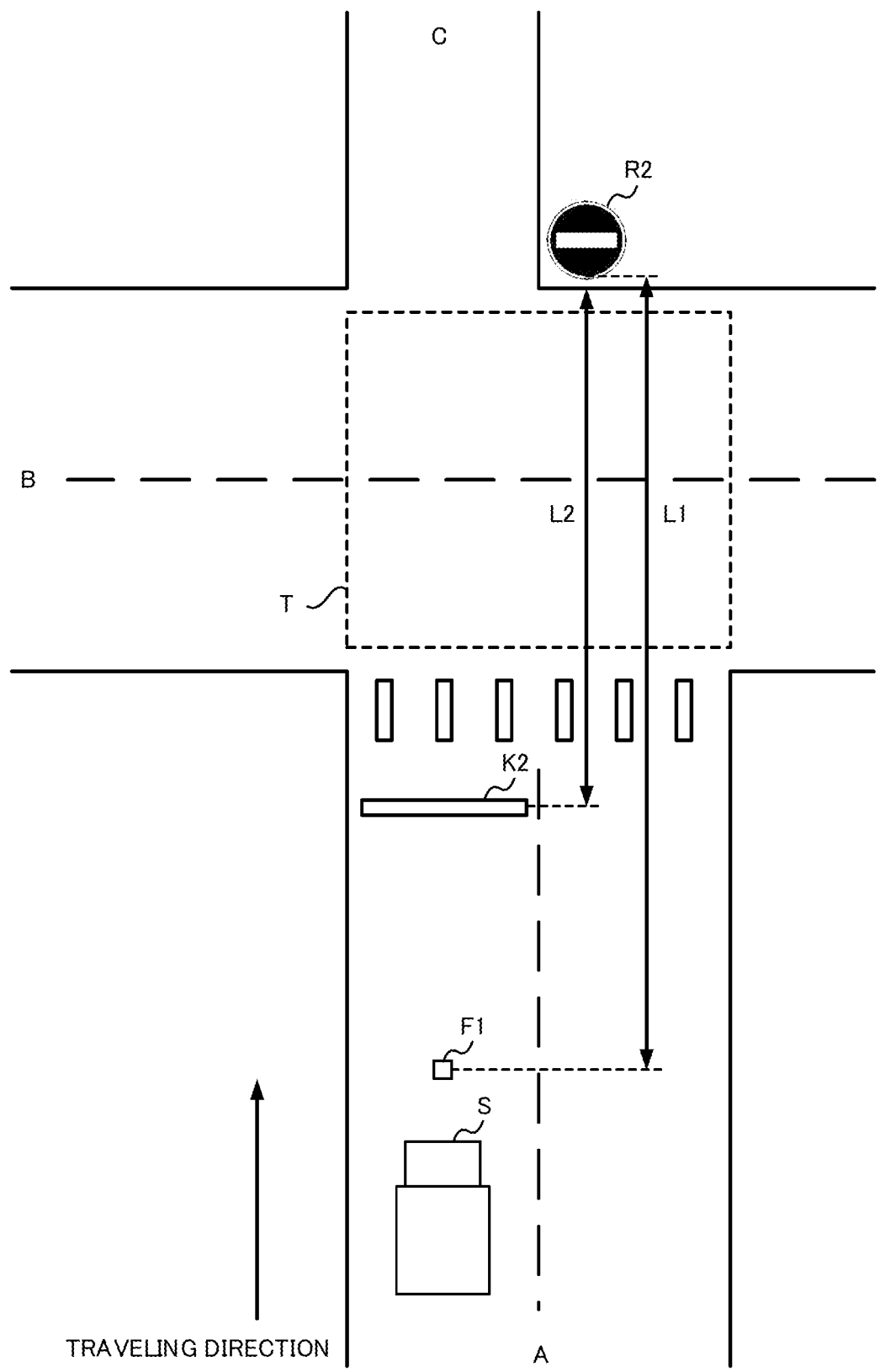
FIG. 4 illustrates an operation for a regulatory sign indicating No Entry.

FIG. 4 illustrates an operation for the regulatory sign indicating No Entry. In FIG. 4, a sign R2 indicating that entry to a road C is prohibited is installed at an intersection T that is ahead in the traveling direction of the vehicle S traveling on the road A. A vehicle stop line K2 on the road A with respect to the intersection T is provided between the vehicle S and the intersection T. In the following description, a road on which the vehicle S travels (as an example, the road A in FIG. 4) may be referred to as a traveling road. In FIG. 4, in a case where the displaying of the image is started on condition that the distance acquired by the acquisition part 231 has become equal to or less than the first display initiation distance L1, the driver can visually recognize the image from the timing at which the front end of the vehicle S is at the position F1. In such a case, there is a possibility that the driver may erroneously recognize that vehicles are prohibited from entering the intersection T.

To counteract this, the display control part 232 begins to display the image on condition that the distance acquired by the acquisition part 231 has become equal to or less than the second display initiation distance L2, because the sign R2 is the regulatory sign indicating No Entry. The second display initiation distance L2 is a distance at which the driver does not erroneously recognize that vehicles are prohibited from entering an intersection even when the regulatory sign is installed past the intersection ahead in the traveling direction of the vehicle S. Specifically, the second display initiation distance L2 is the sum (e.g., 17 m) of (i) the width of a cross road intersecting with a traveling road at an intersection and (ii) a distance between a stop line provided on the traveling road at the intersection and a shoulder of the cross road. The second display initiation distance L2 is included in the "display initiation distance" shown in FIG. 2.

Since the display control part 232 operates in this manner, the driver can visually recognize the image from the timing at which the front end of the vehicle S is located at the vehicle stop line K2, and therefore it is possible to prevent the vehicle S from erroneously coming to a stop before the intersection.

In a case where the display control part 232 displays the image corresponding to the regulatory sign indicating Stop or No Entry, it is highly likely that the driver of the vehicle S tries to drive safely by performing an operation to decelerate the vehicle S. However, in a case where the camera 1 erroneously detects the regulatory sign indicating Stop or No Entry that is installed on an ordinary road near a highway or installed at a highway junction while the vehicle S is traveling on the highway, and the display controller 2 causes the display part 3 to display the image, it is dangerous if the driver erroneously performs the operation to decelerate the vehicle S.

Therefore, the display control part 232 may begin to display the image corresponding to the regulatory sign if the vehicle speed of the vehicle S is equal to or less than a threshold value. The threshold value is a speed smaller than the minimum speed limit of the highway. For example, if the minimum speed limit is 50 km per hour, the threshold value is 40 km per hour. For example, in a case where the vehicle speed of the vehicle S acquired by the acquisition part 231 at a timing when the distance acquired by the acquisition part 231 has become equal to or less than the display initiation distance is equal to or less than the threshold value, the display control part 232 causes the display part 3 to start displaying the image. On the other hand, in a case where the vehicle speed of the vehicle S acquired by the acquisition part 231 at a timing when the distance acquired by the acquisition part 231 has become equal to or less than the display initiation distance is greater than the threshold value, the display control part 232 does not cause the display part 3 to start displaying the image. As a result, even when the vehicle S erroneously detects the regulatory sign while traveling on the highway, the driver can drive safely.

Even if the camera 1 detects the regulatory sign indicating No Entry and the display control part 232 displays the image corresponding to that regulatory sign on the display part 3, there are cases where the vehicle S would pass by the regulatory sign and travel on. Therefore, when it is identified that the vehicle S has passed by the regulatory sign indicating No Entry on the basis of the distance between that regulatory sign and the vehicle S, the display control part 232 causes the display part 3 to display a warning image that is different from the image corresponding to the regulatory sign. The warning image is an image including characters, marks, and the like indicating "danger" or "stop", for example.

For example, the display control part 232 identifies that the vehicle S has passed by the regulatory sign (i.e., the vehicle S has entered a road where vehicles are prohibited from entering) if the distance acquired by the acquisition part 231 is zero, and causes the display part 3 to display the warning image. By operating the display control part 232 in this manner, it is possible to notify the driver that the vehicle S has entered the road where vehicles are prohibited from entering. The distance (i.e., threshold value) with which the display control part 232 determines whether the vehicle S has passed by the regulatory sign is not limited to zero, and the distance may be a predetermined distance greater than zero and set in advance by a driver or an administrator. In this case, if the distance acquired by the acquisition part 231 is equal to or less than the predetermined distance and the vehicle speed of the vehicle S is equal to or greater than a predetermined vehicle speed, the display control part 232 identifies that the vehicle S has passed through the regulatory sign and causes the display part 3 to display the warning image. Further, even when the distance acquired by the acquisition part 231 is equal to or less than the predetermined distance, if the vehicle speed of the vehicle S is less than the predetermined speed, the display control part 232 determines that the vehicle S is in a state capable of coming to a stop and does not identify that the vehicle S has passed by the regulatory sign. That is, the display control part 232 does not cause the display part 3 to display a warning image if the distance acquired by the acquisition part 231 is equal to or less than the predetermined distance and the vehicle speed of the vehicle S is less than the predetermined speed.

The warning part 233 causes the speaker 4 to output a warning sound when it is identified that the vehicle S has passed by the regulatory sign on the basis of the distance between the regulatory sign indicating No Entry and the vehicle S. The warning sound may be a single sound, such as a beep sound, or may be voice indicating "watch out" or "please stop the car."

For example, the warning part 233 identifies that the vehicle S has passed by the regulatory sign (i.e., the vehicle S has entered the road where vehicles are prohibited from entering) if the distance acquired by the acquisition part 231 is zero, and causes the speaker 4 to output the warning sound. Since the warning part 233 operates in this manner, it is possible to increase the possibility that the driver will know that the vehicle S has entered the road where vehicles are prohibited from entering.

There are cases where the warning part 233 may output the warning sound in a case where the distance acquired by the acquisition part 231 is zero after the driver performed an operation of stopping the vehicle S or turning the vehicle S right or left upon noticing the regulatory sign indicating No Entry immediately before the vehicle S enters the road where vehicles are prohibited from entering.

Therefore, the warning part 233 identifies a distance traveled by the vehicle S after it has passed by the regulatory sign on the basis of (i) a time period that has passed since a timing at which the vehicle S was identified to have passed by the regulatory sign indicating No Entry and (ii) the vehicle speed of the vehicle S. Then, the warning part 233 may cause the speaker 4 to output the warning sound if the identified distance is equal to or greater than a threshold value. The threshold is a distance greater than the length of the vehicle S, for example.

The warning part 233 identifies the distance traveled by the vehicle S after it has passed by the regulatory sign on the basis of (i) a difference between a timing at which the distance acquired by the acquisition part 231 is zero and the current time and (ii) the vehicle speed of the vehicle S acquired by the acquisition part 231, for example. The warning part 233 causes the speaker 4 to output the warning sound if the identified distance is equal to or greater than the threshold value, and does not cause the speaker 4 to output a warning sound if the identified distance is less than the threshold value. Since the warning part 233 operates in this manner, it is possible to prevent the speaker 4 from erroneously outputting the warning sound.

<Processing Sequence in the Display Controller 2>

Figure 5:
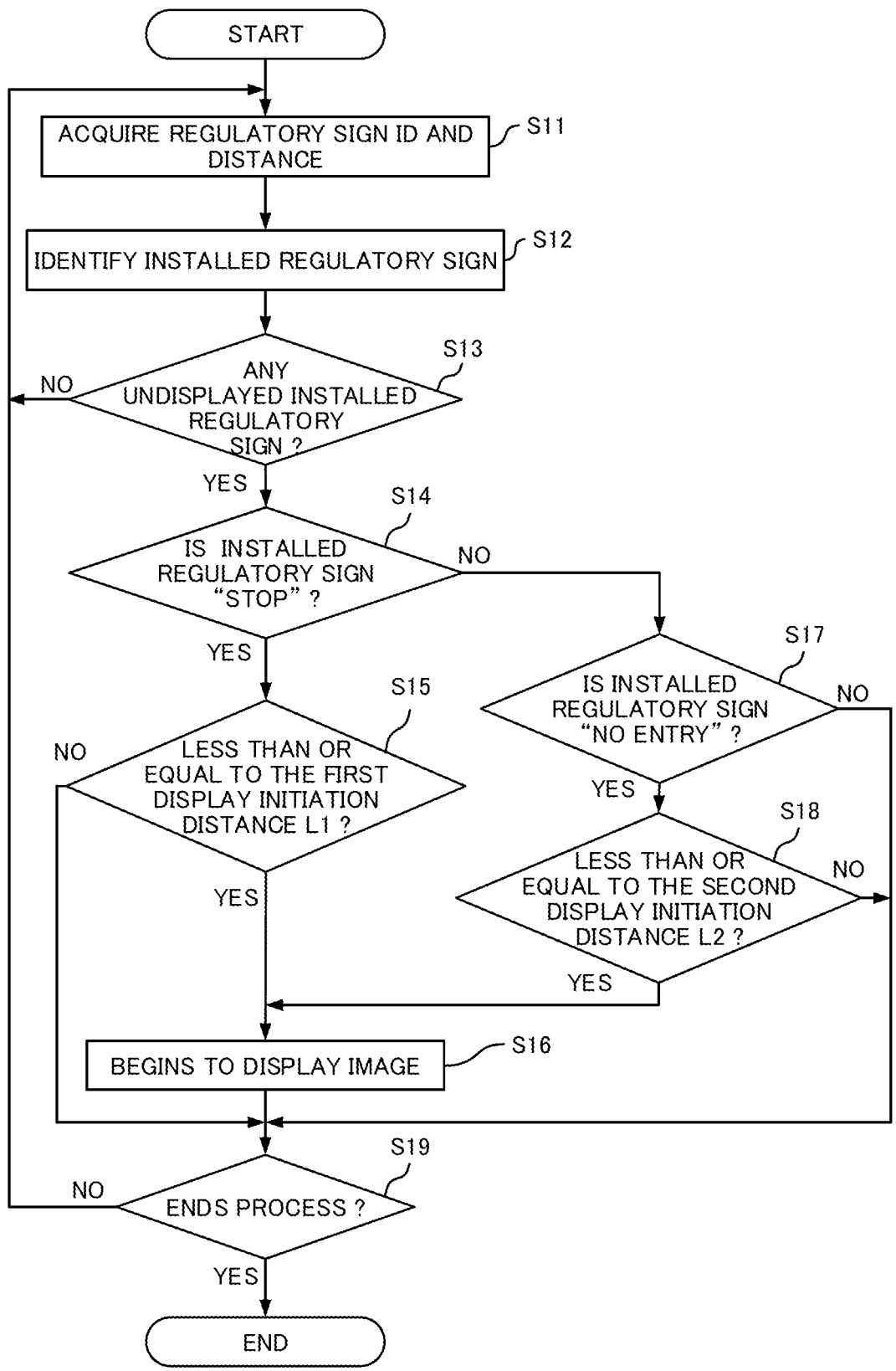
FIG. 5 shows an example of a processing sequence in a display controller 2.

FIG. 5 shows an example of a processing sequence in the display controller 2. The processing sequence shown in FIG. 5 shows, as an example, an operation of determining whether to start displaying the image corresponding to the regulatory sign on the basis of the regulatory sign ID and the distance acquired from the camera 1. The display controller 2 repeats the processing sequence shown in FIG. 5 at regular intervals.

First, the acquisition part 231 acquires a regulatory sign ID and a distance between a regulatory sign and a vehicle S from the camera 1 (S11). By referencing the storage 22, the display control part 232 identifies the regulatory sign corresponding to the regulatory sign ID acquired by the acquisition part 231 (S12).

By referencing the storage 22, the display control part 232 determines whether the display part 3 displays an image corresponding to the identified regulatory sign. If the display control part 232 determines that the image corresponding to the identified regulatory sign is displayed on the display part 3 (NO in S13), the display controller 2 returns the process to step S11. On the other hand, if it is determined that the display part 3 does not display the image corresponding to the identified regulatory sign (YES in S13), the display controller 2 progresses the process to step S14.

If the identified regulatory sign indicates Stop (YES in S14), the display control part 232 determines whether the distance acquired by the acquisition part 231 from the camera 1 is equal to or less than a first display initiation distance L1 corresponding to the regulatory sign (S15). If the distance acquired from the camera 1 is equal to or less than the first display initiation distance L1 (YES in S15), the display control part 232 causes the display part 3 to start displaying an image corresponding to the regulatory sign (S16). On the other hand, if the distance acquired from the camera 1 is greater than the first display initiation distance L1 (NO in S15), the display control part 232 does not cause the display part 3 to start displaying the image corresponding to the regulatory sign.

If the identified regulatory sign is not a sign indicating Stop (NO in S14), the display control part 232 identifies whether the regulatory sign indicates No Entry (S17). If the identified regulatory sign is not a sign indicating No Entry (NO in S17), the display controller 2 progresses the process to step S19. If the identified regulatory sign indicates No Entry (YES in S17), the display control part 232 determines whether the distance acquired by the acquisition part 231 from the camera 1 is equal to or less than a second display initiation distance L2 corresponding to the regulatory sign (S18).

If the distance acquired from the camera 1 is equal to or less than the second display initiation distance L2 (YES in S18), the display control part 232 causes the display part 3 to start displaying an image corresponding to the regulatory sign (S16). On the other hand, if the distance acquired from the camera 1 is larger than the second display initiation distance L2 (NO in S18), the display control part 232 does not cause the display part 3 to start displaying the image corresponding to the regulatory sign.

When an operation of ending the process is not performed (NO in S19), the display controller 2 repeats the processes from step S11 to step S18. When the operation of ending the process is performed (YES in S19), the display controller 2 ends the process.

Modified Example

Figure 6:
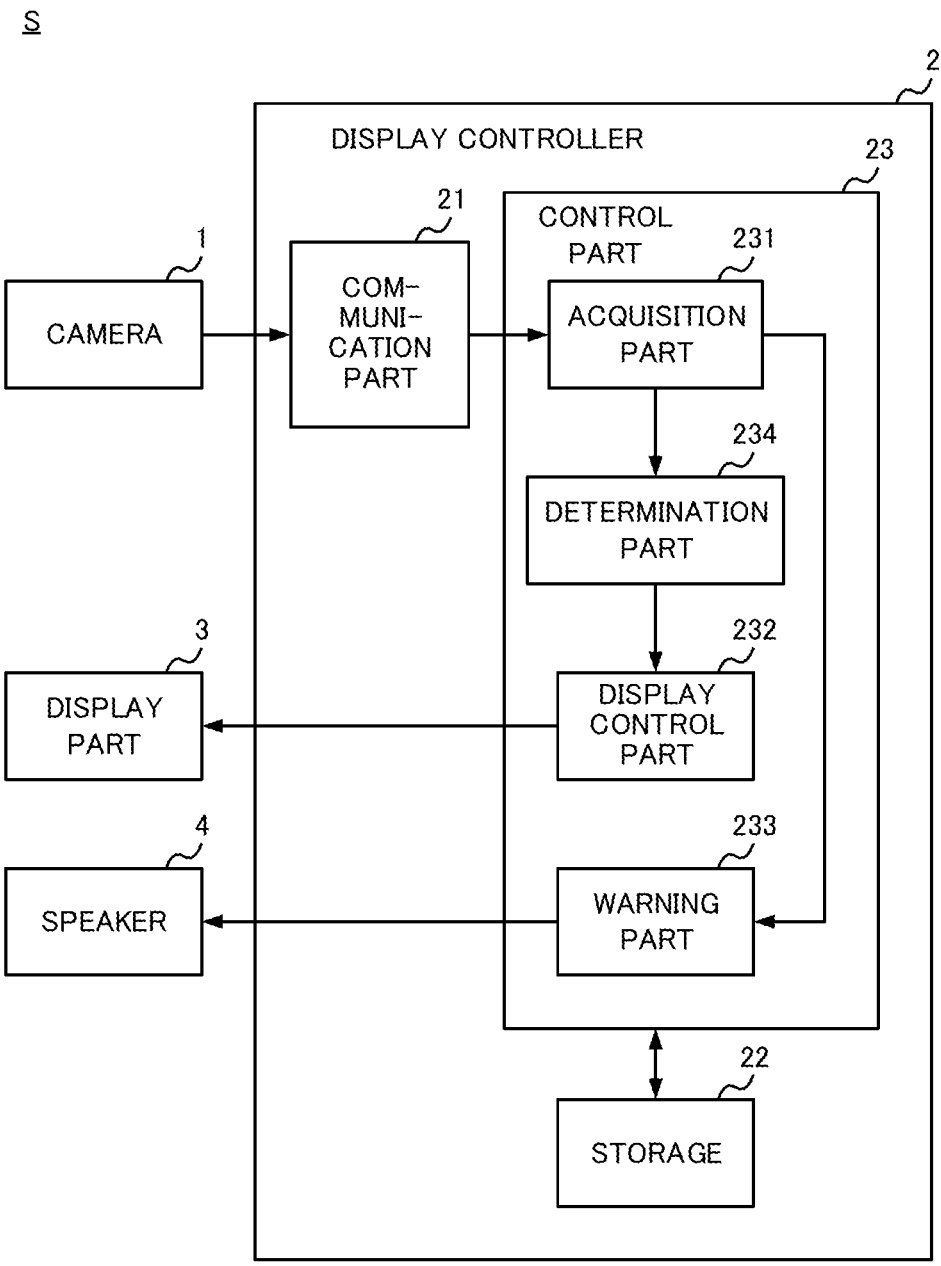
FIG. 6 shows a configuration of a display controller 2 according to a Modified Example.

In the above description, the operation of determining whether the distance between the regulatory sign acquired from the camera 1 and the vehicle S is equal to or less than the display initiation distance stored in the storage 22 is exemplified, but the present disclosure is not limited thereto. The display controller 2 may determine a display initiation distance for each regulatory sign corresponding to the regulatory sign ID acquired from the camera 1. FIG. 6 is a diagram showing a configuration of a display controller 2 according to the Modified Example. The display controller 2 shown in FIG. 6 is different from the display controller 2 shown in FIG. 1 in a point that it includes a determination part 234, and is the same with respect to other points.

The determination part 234 determines a first display initiation distance L1 on the basis of a vehicle speed of the vehicle S and a defined deceleration. For example, by referencing the storage 22, the determination part 234 identifies whether a regulatory sign ID acquired by the acquisition part 231 at the current timing has been acquired at a timing before the current timing as well. If the regulatory sign ID has not been acquired at the timing before the current timing, the determination part 234 identifies a distance travelled from when the vehicle S traveling at the vehicle speed acquired by the acquisition part 231 at the current timing starts decelerating at a deceleration stored in the storage 22 until it stops, and determines the identified distance as the first display initiation distance L1.

The determination part 234 determines a second display initiation distance L2 that is greater than the width of a cross road intersecting with a traveling road at an intersection ahead in the traveling direction of the vehicle S and less than the first display initiation distance L1.

Figure 7:
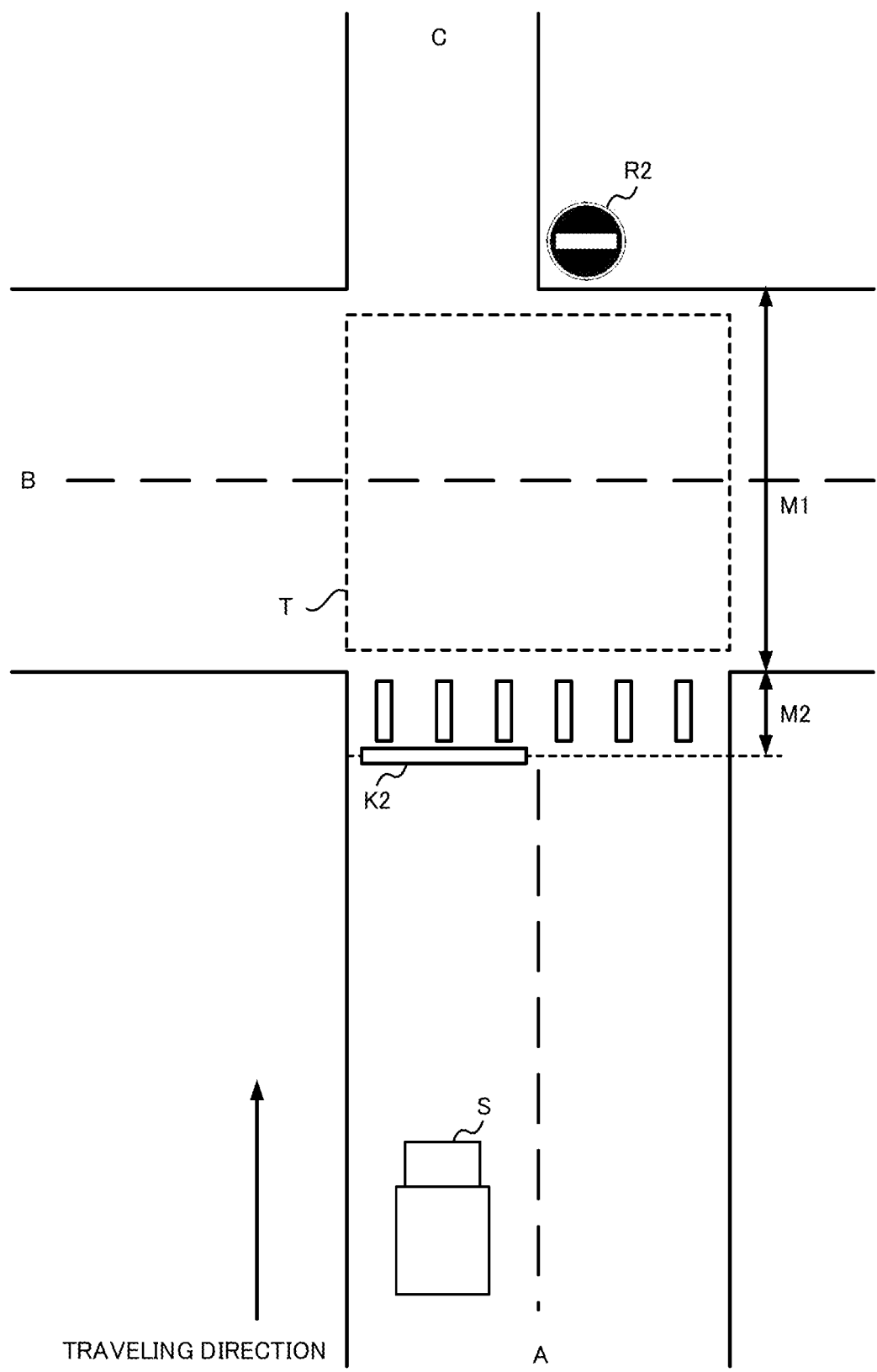
FIG. 7 illustrates an operation of determining a second display initiation distance L2.

FIG. 7 illustrates an operation of determining the second display initiation distance L2. In FIG. 7, a sign R2 indicating that entry to a road C is prohibited is installed at an intersection T ahead in the traveling direction of the vehicle S traveling on a road A (i.e., a traveling road). Further, FIG. 7 shows a vehicle width M1 of a road B (i.e., a cross road) and a distance M2 from a shoulder of the road B to a vehicle stop line K2 on the road A with respect to the intersection T.

The determination part 234 acquires a position of the vehicle S (for example, the latitude and longitude) calculated on the basis of radio waves received from GPS (Global Positioning System) satellites by a GPS unit (not shown) included in the vehicle, for example. By referencing map information stored in the storage 22, the determination part 234 identifies the vehicle width M1 and the distance M2 of the intersection T ahead in the traveling direction from the acquired position of the vehicle S. The determination part 234 determines a total distance of the vehicle width M1 and the distance M2 as the second display initiation distance L2. As described above, since the determination part 234 determines the display initiation distance, the display control part 232 can use the display initiation distance suitable for the position at which the vehicle S travels.

<Effect of the Display Controller 2>

As described above, the display controller 2 includes the acquisition part 231 that acquires the distance between the regulatory sign installed ahead in the vehicle S's traveling direction and the vehicle S, and the display control part 232 that causes the display part 3 to display the image corresponding to the regulatory sign. Then, the display control part 232 begins to display the image corresponding to the regulatory sign on condition that the distance between the regulatory sign and the vehicle S has become equal to or less than the second display initiation distance L2, which is less than the first display initiation distance L1, when the regulatory sign indicates No Entry.

By configuring the display controller 2 in this manner, it is possible to notify the driver at the appropriate traveling position that vehicles are prohibited from entering, and therefore it is possible to prevent the driver from erroneously coming to a stop before the intersection. As a result, the driver can safely operate the vehicle S on the basis of the image displayed by the display part 3.

The present disclosure is explained on the basis of the exemplary embodiments. The technical scope of the present disclosure is not limited to the scope explained in the above embodiments and it is possible to make various changes and modifications within the scope of the disclosure. For example, all or part the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

What is claimed is:

1. A display controller comprising:
    an acquisition part that acquires a distance between a regulatory sign installed in a region ahead of a vehicle and the vehicle; and
    a display control part that causes a display part to display an image corresponding to the regulatory sign on the basis of the distance acquired by the acquisition part, wherein the display control part begins to display the image corresponding to the regulatory sign in response to the distance between the regulatory sign and the vehicle becoming equal to or less than a first distance when the regulatory sign indicates Stop, and begins to display the image corresponding to the regulatory sign in response to the distance between the regulatory sign and the vehicle becoming equal to or less than a second distance, which is less than the first distance, when the regulatory sign indicates No Entry.

2. The display controller according to claim 1, wherein the acquisition part acquires identification information corresponding to the regulatory sign, and
    the display control part causes the display part to display the image on condition that the distance between the regulatory sign and the vehicle has become equal to or less than a display initiation distance indicating a distance for beginning to display an image corresponding to the identification information.

3. The display controller according to claim 1, wherein the display control part causes the display part to display a warning image, which is different from the image corresponding to the regulatory sign, when it is identified that the vehicle has passed by a regulatory sign indicating No Entry, on the basis of a distance between the regulatory sign indicating No Entry and the vehicle.

4. The display controller according to claim 3, wherein the display control part identifies that the vehicle has passed by a regulatory sign if the distance acquired by the acquisition part is equal to or less than the predetermined distance and the vehicle speed of the vehicle is equal to or greater than a predetermined vehicle speed.

5. The display controller according to claim 3, wherein even when the distance acquired by the acquisition part is equal to or less than the predetermined distance, if the vehicle speed of the vehicle is less than the predetermined speed, the display control part determines that the vehicle is in a state capable of coming to a stop and does not identify that the vehicle has passed by a regulatory sign.

6. The display controller according to claim 1, further comprising:
a warning part that causes a speaker to output a warning sound when it is identified that the vehicle has passed by a regulatory sign indicating No Entry, on the basis of a distance between the regulatory sign indicating No Entry and the vehicle.

7. The display controller according to claim 6, wherein the warning part identifies a distance traveled by the vehicle after having passed by the regulatory sign, on the basis of (i) a time period that has passed since a timing at which the vehicle was identified to have passed by the regulatory sign indicating No Entry and (ii) a vehicle speed of the vehicle, and causes the speaker to output the warning sound if the distance is equal to or greater than a threshold value.

8. The display controller according to claim 1, wherein the acquisition part further acquires a vehicle speed of the vehicle, and
the display control part begins to display the image corresponding to the regulatory sign if the vehicle speed of the vehicle is equal to or less than a threshold value.

9. The display controller according to claim 1, further comprising:
a determination part that determines the first distance on the basis of a vehicle speed of the vehicle and a defined deceleration, and determines the second distance that is greater than the width of a cross road intersecting with a traveling road at an intersection ahead in a traveling direction of the vehicle and less than the first distance.

10. A display control method executed by a processor and comprising:
acquiring a distance between a regulatory sign installed in a region ahead of a vehicle and the vehicle; and
causing a display part to display an image corresponding to the regulatory sign on the basis of the distance, wherein
the displaying on the display part includes:
beginning to display the image corresponding to the regulatory sign in response to the distance between the regulatory sign and the vehicle becoming equal to or less than a first distance when the regulatory sign indicates Stop, and
beginning to display the image corresponding to the regulatory sign in response to the distance between the regulatory sign and the vehicle becoming equal to or less than a second distance, which is less than the first distance, when the regulatory sign indicates No Entry.

11. A non-transitory storage medium storing a program for causing a processor to execute:
acquiring a distance between a regulatory sign installed in a region ahead of a vehicle and the vehicle; and
causing a display part to display an image corresponding to the regulatory sign on the basis of the distance, wherein
the causing the display part to display includes:
beginning to display the image corresponding to the regulatory sign in response to the distance between the regulatory sign and the vehicle becoming equal to or less than a first distance when the regulatory sign indicates Stop, and
beginning to display the image corresponding to the regulatory sign in response to the distance between the regulatory sign and the vehicle becoming equal to or less than a second distance, which is less than the first distance, when the regulatory sign indicates No Entry.

* * * * *